C. W. HARRISON & A. C. NOAD.
INCANDESCENT GAS LAMP.
APPLICATION FILED SEPT. 2, 1908.
988,775.
Patented Apr. 4, 1911.
2 SHEETS—SHEET 1.
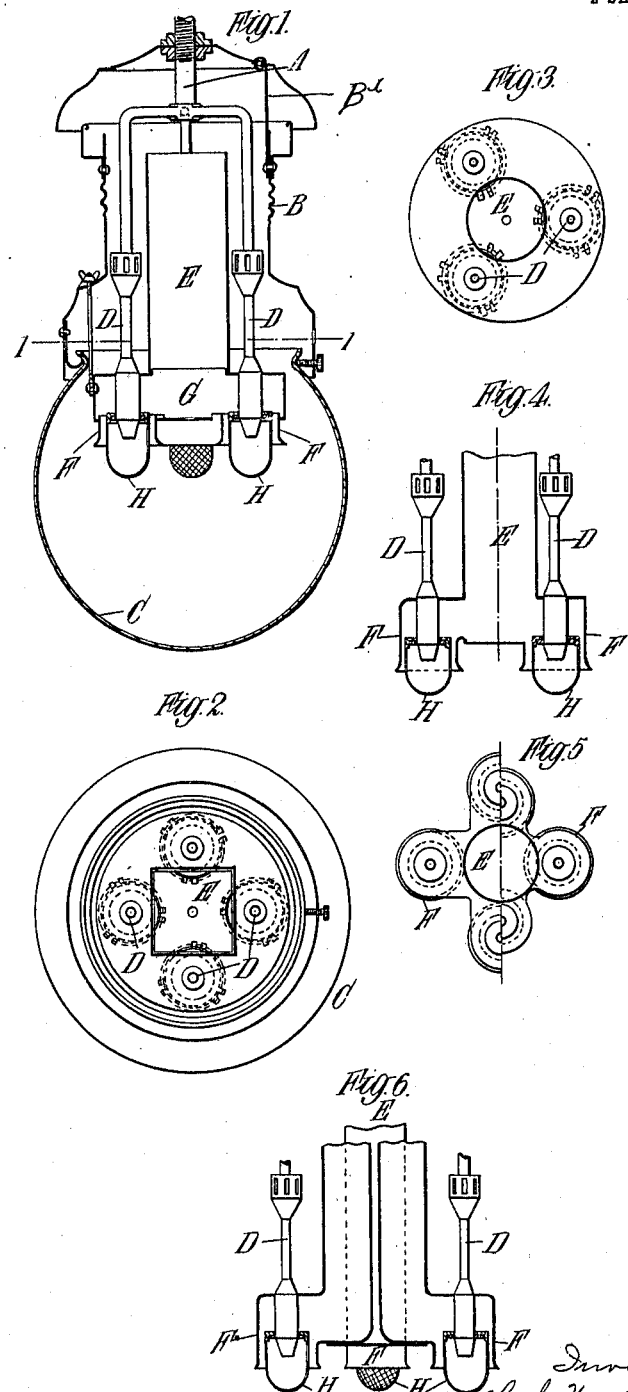

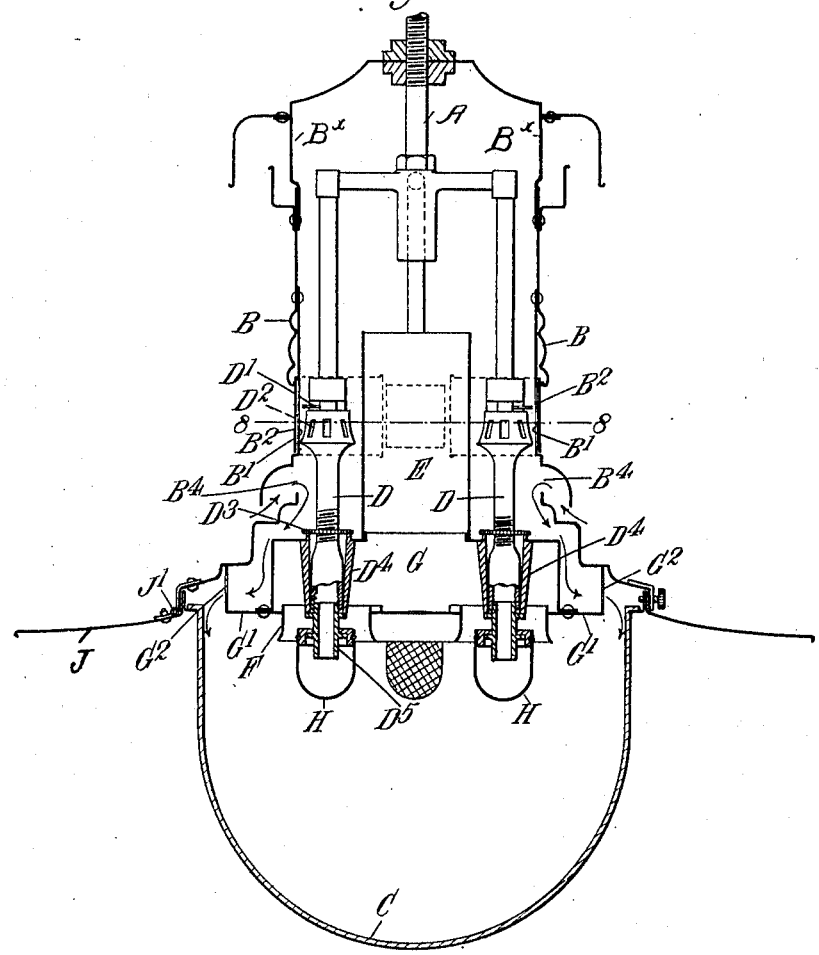

UNITED STATES PATENT OFFICE.

CLARK WAY HARRISON AND ARTHUR CUMMING NOAD, OF LONDON, ENGLAND.

INCANDESCENT GAS-LAMP.

988,775. Specification of Letters Patent. Patented Apr. 4, 1911.

Application filed September 2, 1908. Serial No. 451,464.

*To all whom it may concern:*

Be it known that we, CLARK WAY HARRISON and ARTHUR CUMMING NOAD, both citizens of the United States of America, residing at 96 Middlesex street, in the county of London, England, have invented certain new and useful Improvements in Incandescent Gas-Lamps, of which the following is a specification.

This invention relates to incandescence gas lamps and has particular reference to that class of lamps in which there are several Bunsen burners of the inverted type, the said burners being arranged in such a manner that the ends to which the mantles are attached lie inside, and the air admission openings to the burners lie outside the heat zone, thus preventing the air that passes to the burners for admixture with the gas from becoming contaminated with the products of combustion, and also lessening the heating of the burner tube. Air is usually admitted to the interior of the globe inclosing the mantles at a point near the upper end of the globe whence it passes into the uptake or flue. In one form of such lamps hitherto proposed the said burners are arranged in such a manner that they extend through holes in the uptake or flue of the lamp, but with lamps of this kind the draft of air that enters the globe and flows to the uptake or flue tends to blow the flames of the various burners toward the sides of the mantles nearest the center of the uptake or flue, with the result that there is a considerable loss in the efficiency of the lamp owing to the mantles not being fully incandescent on all sides. In another proposed form of such lamps there are separate straight flues to each burner, the burner tube itself being curved or bent so as to extend through the vertical wall of said flue and then downward to the mantle. This arrangement results in a very clumsy and unsightly lamp owing to the large space necessary for the several flues and burners.

The chief objects of the present invention are to overcome the aforesaid inefficiency and clumsy appearance of such lamps, and to improve the body portion or lamp casing in certain respects and render the various parts of the lamp able to be readily fitted together and taken apart when required as hereinafter described.

For the purpose of our invention each burner is provided with a separate and independent draft tube which communicates with a flue or flues arranged near the center of the lamp casing and with the upper portions of the several burner tubes around the same. A convenient way of obtaining the desired communication from each draft tube to the one or more uptakes or flues is by means of an intermediate chamber into which all the draft tubes lead, and from which the one or more uptakes or flues pass. We preferably construct the lamp so that the aforesaid intermediate chamber and uptake or flue are carried by the burners, and we provide a shutter arrangement on the lamp casing whereby access to the air and gas regulating devices on the burners can be readily gained. We also construct or cover those parts of the burners that project into the heat zone with refractory material of low thermal conductivity; the air supplied to the mouths of the burners from the exterior of the lamp is caused to flow in proximity to the heat zone so as to be heated prior to its reaching the burner mouths, thereby increasing the lighting efficiency. The light-reflecting area is also increased as hereinafter described.

In order that the said invention may be clearly understood and readily carried into effect, we will now proceed to describe the same more fully with reference to the accompanying drawings, in which:—

Figure 1 is a sectional elevation of an outdoor lamp constructed according to this invention. Fig. 2 is a sectional plan of the same on the line 1—1 of Fig. 1. Fig. 3 is a sectional plan corresponding to Fig. 2 of a slightly modified form of the lamp. Fig. 4 is a sectional elevation of two further modified forms, the two halves of the figure showing different constructions. Fig. 5 is a sectional plan corresponding to Fig. 4. Fig. 6 is a sectional elevation of a further modified form of lamp. Fig. 7 is a detail sectional elevation of a lamp showing our improved lamp casing or body portion of the lamp, and the manner in which we prefer to assemble the various parts. Fig. 8 is a section on the line 8—8 of Fig. 7, showing the shutter arrangement on the lamp casing, above referred to.

A is the gas supply pipe, B the lamp casing or body portion of the lamp, C the globe, D D are the Bunsen burners, and E is the uptake or flue.

Referring first to Figs. 1 and 2, the lower end of the uptake or flue E communicates with a concentrically arranged cylindrical chamber G extending laterally beyond the flue E. The said chamber has formed in its lower face holes corresponding in number to that of the burners with which the lamp is furnished. Each of these holes is provided with a draft tube F in the form of a circular depending lip or flange which is advantageously bent outward at its lower edge. The burners D extend (preferably vertically) through the said cylindrical chamber G, and the lower ends support the mantles H which lie with their upper ends surrounded by the aforesaid draft tubes F, the latter being detachably held in position on the lower face of the cylindrical chamber. When the draft tubes F are constructed of opaque material they should be comparatively short so as to extend only a short distance down the side of the mantles, but when they are made of glass or other transparent substance they may extend downwardly to the full depth of the mantles. By reason of there being no central opening in the lower face of the aforesaid cylindrical chamber G, the draft of air that enters the globe C on its way to the uptake or flue E will, by this arrangement, be compelled to pass through the openings immediately surrounding or immediately above the mantles, with the result that the tendency to blow the flames to one side will be overcome and a satisfactory incandescence of the mantles thus obtained. In this construction four burners are shown and a square uptake or flue. In the modified construction shown in Fig. 3, however, there are three burners, and a circular uptake or flue.

Instead of employing the concentrically arranged cylindrical chamber G at the lower end of the uptake or flue, we may make the said flue with a closed bottom as shown in Figs. 4 and 5. We may then provide a number of radially disposed tubes as shown in the left hand half of these figures, each tube, which corresponds to the draft tube F of Fig. 1, being connected at one end with the uptake or flue E and bend downward at the other end. In the right-hand half of each of these figures the draft tubes are shown as constituting laterally and downwardly extending branches of the uptake or flue, each branch constituting a chamber at the bottom and communicating laterally with the lower end of the uptake or flue. These tubes or chambers correspond in number to that of the burners, which at their lower ends project through the upper wall of the said tubes or chambers and project through the lower ends of the latter to receive the mantles.

In the construction shown in Fig. 6, each burner tube is provided with a separate uptake or flue, the several uptakes or flues being centrally clustered together. In all cases the uptakes or flues appertaining to the several burner tubes are arranged near the center of the lamp casing and with the upper portions of the aforesaid burner tubes around the same, the air intakes of the burner tubes being below the level of the top of the uptakes or flues.

Referring now to Figs. 7 and 8, it will be seen that the portion of the lamp casing B that is adjacent to the gas regulators $D'$ and air regulators $D^2$ of the burners is provided with an aperture $B'$ opposite each burner; a shutter $B^2$ surrounds this part of the lamp casing and has a single gap or opening $B^3$. By revolving the shutter $B^2$, the gap or opening $B^3$ can be brought into coincidence with any one of the apertures $B'$, and access to the corresponding gas or air regulator can thus be obtained. The lower portion of each burner tube is screw-threaded, for a portion of its length and an adjusting nut $D^3$ is screwed thereon. The portion of each burner extending beyond the adjusting nut projects through the chamber G and is protected from the intense heat of the heat-zone by the sleeve $D^4$ of refractory material such as magnesia. The burner mouth $D^5$ also consists of refractory material such as magnesia of low thermal conductivity the object being to keep the burner as cool as possible. When the uptake or flue E has been placed between the burners D and the ends of the burners have been inserted into the chamber G, the sleeves $D^4$ are placed in position and the burner pieces $D^5$ screwed on to the ends of the burner tubes. The uptake or flue E and chamber G are thus supported by the burners, and can be readily removed by swinging back the globe C, unscrewing the burner mouth pieces $D^5$ and withdrawing the sleeves $D^4$.

The lower face of the intermediate chamber G extends beyond the vertical wall of the chamber and this extension or flange $G'$ is formed with a perforated rim or lip $G^2$ which bears against the body portion or casing B of the lamp. This casing B is supported by three or more straps $B^x$. The under face of the flange $G'$ is painted or enameled white, thereby increasing the light reflecting area, which is chiefly furnished by the usual reflector J. A further advantage of the flange $G'$ and rim $G^2$ is that the flue and intermediate chamber when being raised into place are guided into the correct position by the contact of the rim $G^2$ with the lamp casing.

The lamp casing B is provided with a series of perforations $B^4$ through which the external air passes on its way to the globe C and the air intakes of the burners D. The perforations $B^4$ are so located with respect to the intermediate chamber that the air, in passing toward the globe, has to travel, as shown by the arrows, over the exterior of the chamber G and the extension G', and these being very hot, heat the air, thereby increasing the efficiency of the burners. The reflector J, to which the globe C is attached, can be swung with the globe about the pivot J' when it is desired to gain access to the mantles.

What we claim and desire to secure by Letters Patent of the United States is:—

1. In an incandescence gas lamp, the combination of a plurality of inverted burners, gas regulating devices on said burners, a lamp casing inclosing said burners and having an aperture in it adjacent to each gas regulating device, and means whereby said apertures are normally covered but can be exposed one at a time.

2. In an incandescence gas lamp, the combination of a plurality of inverted burners, gas regulating devices on said burners, a lamp casing inclosing said burners and having an aperture in it adjacent to each gas regulating device, and a revoluble shutter surrounding the lamp casing and having a gap in it which can be brought into coincidence with either of the apertures in the aforesaid lamp casing.

3. In an incandescence gas lamp, the combination of a plurality of inverted burners, gas regulating devices on said burners, a centrally arranged flue for said burners having the upper portions of the burners located alongside its exterior, a lamp casing inclosing said burners and flue, with an aperture in it adjacent to each gas regulating device, and means whereby said apertures are normally covered but can be exposed one at a time.

4. In an incandescence gas lamp, the combination of a plurality of inverted burners, gas regulating devices on said burners, a centrally arranged flue for said burners having the upper portions of the burners located alongside its exterior, a lamp casing inclosing said burners and flue, with an aperture in it adjacent to each gas regulating device, and a revolving shutter surrounding the lamp casing and having a gap in it which can be brought into coincidence with either of the apertures in the aforesaid lamp casing.

5. In an incandescence gas lamp, the combination of a plurality of inverted burners, gas regulating devices on said burner, a centrally arranged flue for said burners having the upper portions located alongside its exterior, a laterally extending chamber situated at the lower end of said flue and having the lower ends of the burners projecting through it, a lamp casing inclosing said burners and flue with an aperture in it adjacent to each gas regulating device, and means whereby said apertures are normally covered but can be exposed one at a time.

6. In an incandescence gas lamp, the combination of a plurality of inverted burners, gas regulating devices on said burner, a centrally arranged flue for said burners having the upper portions located alongside its exterior, a laterally extending chamber situated at the lower end of said flue and having the lower ends of the burners projecting through it, a lamp casing inclosing said burners and flue with an aperture in it adjacent to each gas regulating device, and a revolving shutter surrounding the lamp casing and having a gap in it which can be brought into coincidence with either of the apertures in the aforesaid lamp casing.

7. In an incandescence gas lamp, the combination of a plurality of inverted burners, a centrally arranged flue for said burners having the upper portions of the burners located alongside its exterior, a laterally extending chamber situated at the lower end of said flue and having the lower ends of the burners projecting through it, and material of low thermal conductivity composing the portions of the burners that are exposed to heat by projecting into said chamber, for the purpose specified.

8. In an incandescence gas lamp, the combination of a plurality of inverted burners, gas regulating devices on said burners, a centrally arranged flue for said burners having the upper portions of the burners located alongside its exterior, a laterally extending chamber situated at the lower end of said flue and having the lower ends of the burners projecting through it, material of low thermal conductivity composing the portions of the burners that are exposed to heat by projecting into said chamber, a lamp casing inclosing said burners and flue, and means whereby said gas regulating devices can be reached from outside the lamp casing without removing it.

9. In an incandescence gas lamp, the combination of a plurality of inverted burners, means for conducting the products of combustion upward, a lamp casing inclosing the burners and the aforesaid upwardly conducting means, and means whereby the said upwardly conducting means are maintained in position in such a manner that the same can be removed from the lamp casing without removing any part of said casing.

10. In an incandescence gas lamp, the combination of a plurality of inverted burners, detachable mouth pieces to said burners, means for conducting the products of combustion upward, a lamp casing inclosing the upper parts of the burners, and the aforesaid upwardly conducting means, and means whereby the latter is supported by the aforesaid detachable burner mouth pieces independently of the said lamp casing.

11. In an incandescence gas lamp, the combination of a plurality of inverted burners, a flue for said burners having the upper portions of the burners located alongside its exterior, detachable mouth pieces to said burners, and means whereby said flue is supported by the burners independently of the lamp casing.

12. In an incandescence gas lamp, the combination of a plurality of inverted burners, a centrally arranged flue for said burners having the upper portions of the burners located alongside its exterior, a laterally extending chamber situated at the lower end of said flue and having the lower ends of the burners projecting through it, and means whereby said flue and chamber are supported by the burners.

13. In an incandescence gas lamp, the combination of a plurality of inverted burners having detachable mouth pieces, a centrally arranged flue for said burners having the upper portions of the burners located around it, a laterally extending chamber situated at the lower end of said flue and having the lower ends of the burners projecting through it, and means whereby the burner mouthpieces support said flue and chamber.

14. In an incandescence gas lamp, the combination of a plurality of inverted burners, a centrally arranged flue for said burners having the upper portions of the burners located alongside its exterior, a laterally extending chamber situated at the lower end of said flue and having the lower ends of the burners projecting through it, and a laterally extending flange on the lower face of said chamber for the purposes specified.

15. In an incandescence gas lamp, the combination of a plurality of inverted burners, a centrally arranged flue for said burners having the upper portions of the burners located alongside its exterior, a laterally extending chamber situated at the lower end of said flue and having the lower ends of the burners projecting through it, a lamp casing inclosing the burners and flue, a laterally extending flange on the lower face of said chamber, and an upwardly extending perforated rim for centering said chamber in the lamp casing.

16. In an incandescence gas lamp, the combination of a plurality of inverted burners, a centrally arranged flue for said burners having the upper portions of the burners located alongside its exterior, a laterally extending chamber situated at the lower end of said flue and having the lower ends of the burners projecting through it, a laterally extending flange on the lower face of said intermediate chamber, and means whereby the external air for combustion with the gas at the burner mouths is caused to flow over the exterior of said chamber and laterally extending flange, for the purpose specified.

17. In an incandescence gas lamp, the combination of a plurality of inverted burners, a centrally arranged flue for said burners having the upper portions of the burners located alongside its exterior, a laterally extending chamber situated at the lower end of said flue and having the lower ends of the burners projecting through it, a laterally extending flange on the lower face of said chamber, a perforated upwardly extending rim on said flange, and means whereby the external air for combustion with the gas at the burner mouths is caused to flow over the exterior of said chamber, the upper surface of said flange, and through the perforations in the rim on said flange, for the purposes specified.

18. In an incandescence gas lamp, the combination of a plurality of inverted burners, a centrally arranged flue for said burners, having the upper portions of the burners located alongside its exterior, a laterally extending chamber situated at the lower end of said flue and having the lower ends of the burners projecting through it, a laterally extending flange on the lower face of said chamber, a perforated upwardly extending rim on said flange, a lamp casing inclosing the burners and flue, and means whereby the external air passes through said lamp casing and flows over the exterior of the aforesaid chamber, over the upper surface of the flange thereon, and through the perforations in the rim on said flange, for the purposes specified.

In testimony whereof we affix our signatures in presence of two witnesses.

CLARK WAY HARRISON.
ARTHUR CUMMING NOAD.

Witnesses:
G. M. SMITH,
G. M. HOGG.